April 30, 1968  A. F. WILSON  3,380,291
MEASUREMENT OF ELASTIC BEHAVIOR AT LOW TEMPERATURES
Filed July 6, 1965

ANGUS F. WILSON
INVENTOR.

BY Harry M. Saragovitz,
Edward J. Kelly, Herbert Berl
& Lawrence E. Labadini
ATTORNEYS

United States Patent Office 3,380,291
Patented Apr. 30, 1968

3,380,291
MEASUREMENT OF ELASTIC BEHAVIOR
AT LOW TEMPERATURES
Angus F. Wilson, Cochituate, Mass., assignor to the
United States of America as represented by the
Secretary of the Army
Filed July 6, 1965, Ser. No. 469,952
12 Claims. (Cl. 73—15.6)

ABSTRACT OF THE DISCLOSURE

A method for determining the elastic behavior of an elastomer at low temperatures which comprises deforming an elongate sample of the elastomer by twisting the same about its long axis, lowering the temperature of the sample until it will maintain its deformed condition without mechanical restraint, removing restraint at one end of the sample and increasing the temperature of the sample until it begins to recover its elastic properties as evidenced by movement of the sample as it returns to its non-deformed condition.

---

The invention described herein, if patented, may be manufactured and used by or for the Government for governmental purposes without the payment to me of any royalty thereon.

This invention relates to a method and apparatus for measuring the elastic properties of materials at low temperatures and, more particularly, to a method and apparatus for measuring the regain of elasticity of elastomers during warming from the frozen state.

Elasticity is that property possessed by certain materials, referred to generally as elastomers, which permits or allows a body deformed under a strain to return unaided to its orginal size and shape upon removal of the strain. Elastomers find use in a wide range of applications in which repeated strains are applied to a body which is required to absorb the energy thereof by deformation and to subsequently return to its original form. At low temperatures, elastomers lose their elastic properties so that they are unable to be deformed or, if deformed and held at low temperatures are unable to recover from the deformation. As a conseqeunce, when designing equipment for use in low temperature enviroments which equipment utilizes elastomeric components, it is essential that the low temperature elastic behavior of elastomers used be known. For this reason, there is a need for a single technique of ascertaining the elasticity of different materials at low temperatures and, more importantly, a method of determining the temperature range over which a material loses or regains this property. Testing methods presently in use for measuring low temperature behavior of rubber-like materials are not satisfactory in that they inherently introduce variables that affect the results or merely measure the flexibility of the sample rather than its elasticity.

Accordingly, it is among the objects of the present invention to provide a method and apparatus for measuring the low temperature behavior of elastomers.

Another object is to provide a method and means for measuring elasticity at low temperatures.

It is also an object to provide a method and means for measuring the regain of elasticity of an elastomer from a frozen state. Other objects will become apparent from the following detailed description.

The apparatus of this invention can best be illustrated by referring to the accompanying drawings in which.

Figure 1:
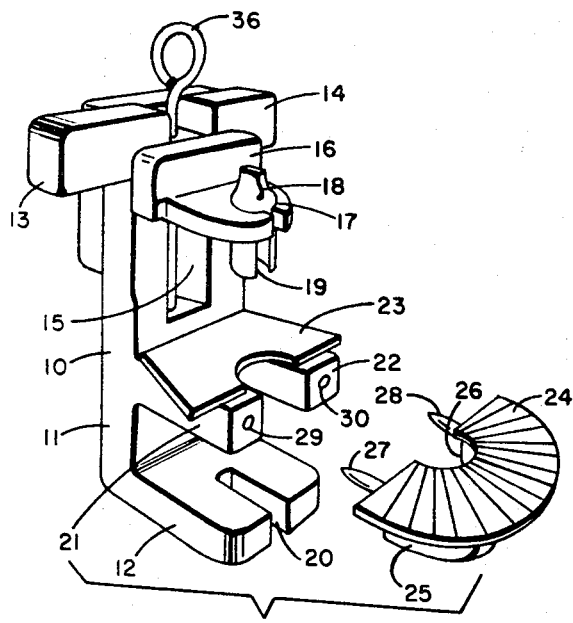
FIGURE 1 represents a view in perspective of the apparatus disassembled to facilitate insertion of the sample.
Figure 2:
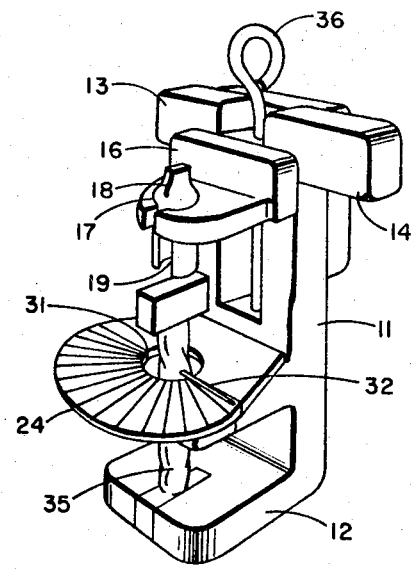
FIGURE 2 represents another view of the apparatus of FIGURE 1 completely assembled with the sample deformed and conditioned for testing.

Referring to the drawings, there is shown in FIGURE 1, a preferred embodi-ment of the test apparatus of this invention, designated generally by numeral 10 with a portion thereof separated to allow insertion of an elastomer sample. This illustrated embodiment is fabricated out of a plastic material, e.g., polymethylmethacrylate, a material not affected by the low temperatures encountered in the testing of samples. The apparatus consists of a frame 11 supported in a vertically upstanding position by a base 12 affixed to and projecting forwardly of and at right angles thereto. The frame is generally rectangular in outline but has at the top thereof laterally extending integral wing projections 13 and 14. A slot 15 extends downwardly from the top of the frame 11 about one-third of its length. An upper clamp support member 16, having grooves 33 and 34 on opposite sides thereof, is positioned within slot 15 in such a manner that the grooves grip the frame on either side of the slot and serve to hold the support member 16 in position within the slot by virute of a frictional fit. Upper clamp support member 16 extends forwardly of and at a right angle with respect to the frame and can be manually moved within the slot 15 to any position desired. Located within the upper clamp support member 16, at a point removed from the frame 11, is a keyhole 17 into which is inserted and tightly seated a cylindrically-shaped upper clamp 18. That portion of the clamp extending below the upper clamp support member has a narrow slot 19 therein which is adapted to receive one end of the elastomer sample 35. A second narrow slot 20 is located in base 12 and is similarly adapted to receive one end of the sample 35. While a snug fit is usually sufficient to hold the sample within the slots other clamping means, e.g., screw clamps, may be employed if necessary to hold the ends of the sample.

Two spaced apart short posts 21 and 22 are attached to the frame 11 midway between the top and bottom thereof and at right angles thereto to form a support for thin flat shelf 23. A semi-circular scale 24, shown detached from the apparatus in FIGURE 1, is mounted upon two posts 25 and 26. Pins 27 and 28 protruding from posts 25 and 26, respectively, are adapted to be inserted within holes 29 and 30 provided in posts 21 and 22. With the pins inserted within holes 29 and 30, shelf 23 and scale 24 are brought into contact to form a flat, continuous platform having a circular aperture 31, the center of which is located in a line between slot 19 and slot 20 and on the line separating the shelf 23 and the scale 24.

Figure 3:
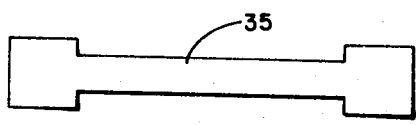
FIGURE 3 is a plan view of a sample used in FIGURES 1 and 2.

The operation of the test apparatus 10 and the method of determining the regain of elasticity of an elastomer sample will be understood from the following detailed description. A standard elongate sample, as shown in FIGURE 3, is die-cut from a sheet of elastomeric material 75 mils in thickness so as to be 1½ inches in length and ⅛ inch in width except for the last ¼ inch at either end of the sample which is ¼ inch in width. In order to insert the sample into the test apparatus the scale 24 is first removed as shown in FIGURE 1. One end of sample 35 is inserted into and held by means of a snug fit within groove 20 located in the base of the apparatus. The upper clamp support member 16 is manually drawn upwards along frame 11. The unsecured end of the sample is held upright by hand and twisted 360° counterclockwise about its longitudinal axis. The upper clamp support member is lowered and the upper end of the sample is inserted within the snug-fitting groove 20 in the upper clamp 18. It is to be noted that the sample as a whole is not stretched longitudinally. When both ends of the sample are thus secured in a twisted position a slender straight pointer 32 is inserted through the sample at a point therein between the shelf 23 and upper clamp 18 and preferably just below the upper clamp so as to extend at a right angle to the broad side of the sample. The scale 24 is attached to the apparatus enclosing the deformed sample within the aperture 31 and the upper clamp is then adjusted by rotation within the keyhole 17 so as to zero the pointer 31 on the beginning or base line of the scale.

The apparatus is now ready to be inserted into the low temperature bath. Suitable clamps or wires, not shown in the drawings, are attached to the wing projections 13 and 14 and the test apparatus is lowered into a liquid or gaseous bath in which the temperature is sufficiently low to freeze the sample and the sample is held at or below this temperature for approximately 10 minutes to thoroughly condition the sample. After the sample has been conditioned, and while in the low temperature bath, an eyelet 36 mounted on top of the upper clamp support member 16 is engaged by a hook and the upper clamp support member is drawn upwardly until the upper portion of the now frozen sample is free of the restraint of the upper clamp 18. The sample at this low temperature maintains its deformed condition without external restraint since it no longer functions as an elastic material. The temperature within the bath is gradually raised at a predetermined constant rate, e.g., 1° C. per minute. As the bath is warmed it eventually reaches a temperature at which the sample begins, as a result of the recovery of its elastic properties, to return to its original state. As it recovers its elasticity, the sample begins to unwind and the pointer 32 moves in a clockwise direction over the face of the scale. By comparing this movement with the temperature of the bath, the temperature at which the sample begins to recover its elastic properties, the rate of recovery and the temperature at which a specified amount of recovery occurs can all be determined. The values will of course vary with the type of material being tested and thus can be used to characterize the low temperature behavior of various kinds of elastomeric materials.

As an example, a sample of a butadiene-acrylonitrile copolymer, such as B. F. Goodrich Hycar 1001, was tested in the device and according to the method described above. The temperature of the bath was brought to −40° C. to freeze the sample. Upon warming at a rate of 1° C. per minute it was found that at −20° C. the needle began to move over the scale, at −12° C. the sample reached a constant rate of recovery and at −6° C. the sample had recovered 180° of its twist. The test is usually stopped at this point, sufficient information having been obtained. Recovery beyond this point can be determined by using a full circular scale.

While the above described procedure requires that the temperature be raised at a constant rate, this apparatus can be used to measure recovery rates at specific temperatures. For example, a specimen can be deformed, conditioned at a specific temperature while so deformed and released from restraint. The time required to recover a predetermined amount, e.g., 90° or 180°, can then be measured.

The method and apparatus described is novel in that it measures regain of elasticity and uses samples that are all deformed to substantially the same degree. Elastic recovery is measured since there are no external forces acting on the sample as it warms and the movement of the sample is due solely to the elastic behavior of the material. Further, since all samples are of the same size and thickness, they are all deformed by essentially the same amount, i.e., the amount necessary to twist the sample −360°. It should be noted that the amount of deformation required for this test is quite small, i.e., the side of the test specimen is elongated approximately 5% during twisting, and in recovery through 180°, the normal maximum measurement obtained represents a decrease in elongation of the twisted side of the sample of approximately 2.5%. This degree of deformation compares well with the amount of deformation often encountered by elastomers in service. Consequently the procedure and apparatus described measure properties under conditions representative of those encountered in practical applications. While it is normally preferred that the sample be twisted through 360°, it is also possible with this apparatus and method to twist the sample within a range of 180° to 540° and obtain meaningful results.

The invention described in detail in the foregoing specification is susceptible to changes and modifications as may occur to persons skilled in the art without departing from the principle and spirit thereof. The terminology used is for purposes of description and not of limitation, the scope of the invention being defined in the claims.

I claim:
1. A method of characterizing the low temperature behavior of an elastomer which comprises:
  (a) deforming a sample of an elastomer by twisting,
  (b) restraining said deformed sample,
  (c) lowering the temperature of the sample to a point at which said sample will maintain its deformed condition without restraint,
  (d) removing restraint from said sample,
  (e) gradually increasing the temperature of the deformed sample, and
  (f) observing the temperature at which a predetermined movement of the sample occurs.

2. A method of characterizing the low temperature behavior of an elastomer which comprises:
  (a) deforming an elongate sample of an elastomer by twisting,
  (b) restraining said deformed sample,
  (c) lowering the temperature of the sample to a point at which said sample will maintain its deformed condition without restraint,
  (d) removing restraint from said sample,
  (e) gradually increasing the temperature of the deformed sample, and
  (f) observing the temperature at which a predetermined movement of the sample occurs.

3. A method according to claim 2 wherein said temperature is increased at a constant rate.

4. A method according to claim 2 wherein said sample is twisted between 180° and 540°.

5. A method according to claim 2 wherein said sample is twisted 360°.

6. A method of characterizing the low temperature behavior of an elastomer which comprises:
  (a) deforming an elongate sample of an elastomer by twisting about its long axis,
  (b) restraining the ends of the sample to maintain the deformed condition,
  (c) lowering the temperature of the sample to a point at which the sample will maintain its deformed condition without restraint,
  (d) removing the restraint from one end of the sample,
  (e) gradually increasing the temperature of the deformed sample and,
  (f) observing the temperature at which a predetermined movement of the sample occurs.

7. A method according to claim 4 wherein said temperature is increased at a constant rate.

8. A method according to claim 6 wherein said sample is twisted between 180° and 540°.

9. A method according to claim 6 wherein said sample is twisted 360°.

10. A method of determining the temperature at which an elastomer recovers or loses its elasticity which comprises:
   (a) deforming an elongate sample of an elastomer by twisting the same about its long axis,
   (b) restraining the ends of the sample to maintain the deformed condition,
   (c) lowering the temperature of the sample to a point at which the sample will maintain its deformed condition without restraint,
   (d) removing the restraint from one end of the sample,
   (e) gradually increasing the temperature of the deformed sample, and
   (f) observing the temperature at which the sample begins to return to its original state and the temperature at which specified degrees of recovery of the sample occur.

11. A method according to claim 10 wherein said sample is twisted between 180° and 540°.

12. A method according to claim 10 wherein the sample is twisted one complete turn of 360°.

References Cited

UNITED STATES PATENTS 2,579,424   12/1961   Gehman _____ 73—15.6

OTHER REFERENCES

American Society for Testing and Materials, ASTM, Designation D 1053–61, 1961, pp. 453–461.

JAMES J. GILL, *Primary Examiner.*

E. E. SCOTT, *Assistant Examiner.*